US009557173B1

(12) United States Patent
Perahia et al.

(10) Patent No.: US 9,557,173 B1
(45) Date of Patent: Jan. 31, 2017

(54) INTEGRATED LASER VIBROMETER MEMS MICRO-SHELL GYROSCOPE

(71) Applicant: HRL Laboratories, LLC, Malibu, CA (US)

(72) Inventors: Raviv Perahia, Calabasas, CA (US); Richard J. Joyce, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 150 days.

(21) Appl. No.: 14/548,222

(22) Filed: Nov. 19, 2014

(51) Int. Cl.
*G01C 19/64* (2006.01)
*G01C 19/56* (2012.01)
*G01C 25/00* (2006.01)

(52) U.S. Cl.
CPC ............. *G01C 19/56* (2013.01); *G01C 25/00* (2013.01)

(58) Field of Classification Search
CPC ..... G01C 19/56; G01C 19/5783; G01C 25/00; G01B 9/02092; G01B 9/02097
USPC ......................................................... 356/459
See application file for complete search history.

(56) References Cited

U.S. PATENT DOCUMENTS 5,838,439 A * 11/1998 Zang ........................ G01H 9/00
356/484
5,883,715 A 3/1999 Steinlechner et al.

OTHER PUBLICATIONS

Micromachined Polycrystalline Diamond Hemispherical Shell Resonators, IEEE, Transducers 2013, Barcelona, Spain, Jun. 16-20, 2013.*
Unterreithmeier, Q.P., Weig, E.M., & Kotthaus, J.P. in "Universal Transduction Scheme for Nanomechanical Systems Based on Dielectric Forces", Nature, vol. 458, pp. 1001-1003, Apr. 2009.
Kwan H. Lee, T.G. in "Cooling and Control of a Cavity Optoelectromechanical System" Phys. Rev. Lett., American Physical Society, vol. 104, Issue 12, pp. 1-4. Feb. 2010.
Griffiths, D.J. Introduction to Electrodynamics. Saddle River: Prentice Hall, pp. 179-196.
P. Shao, L.D. Sorenson, X. Gao, and F. Ayazi, "Wineglass On-A-Chip" Solid-State Sensors, Actuators, and Microsystems Workshop Hilton Head Island South Carolina, Jun. 3-7, 2012, p. 275-278.
M.L. Chan, J. Xie, P. Fondal, H. Najar, K. Yamazaki, L. Lin and D.A. Horsley, "Micromachined Polycrystalline Diamond Hemispherical Shell Resonators" Solid-State Sensors, Actuators, and Microsystems Workshop Hilton Head Island, South Carolina, Jun. 3-7, 2012, pp. 355-358.
D. Senkal, C.R. Raum, A.A. Trusov, and A.M. Shkel, "Titania Silicate/Fused Quartz Glassblowing for 3-D Fabrication of Low Internal Wineglass Micro-Structures" Solid-State Sensors, Actuators, and Microsystems Workshop Hilton Head Island, South Carolina, Jun. 3-7, 2012, pp. 267-270.

(Continued)

*Primary Examiner* — Tarifur Chowdhury
*Assistant Examiner* — Jonathon Cook
(74) *Attorney, Agent, or Firm* — Ladas & Parry

(57) ABSTRACT

A gyroscope including a dielectric resonator, a laser vibrometer on a first side of the dielectric resonator, and a laser dump for redirecting or absorbing light received at the laser dump from the laser vibrometer, the laser dump on a second side of the dielectric resonator. A first distance between the dielectric resonator and the laser vibrometer ranges from 10 nm to 20 μm, and a second distance between the dielectric resonator and the laser dump ranges from 10 nm to 20 μm.

19 Claims, 3 Drawing Sheets

(56) References Cited

OTHER PUBLICATIONS

"Formulas for Natural Frequency and Mode Shape", R.D. Blevins, Krieger Publishing Company, pp. 298-299, 2001.
C. Acar, A. Shkel in "MEMS Vibratory Gyroscopes", Spring 2009, pp. 124-125.
G. A. Massey, "An Optical Heterodyne Ultrasonic Image Converter" Proceedings of the IEEE, vol. 56. No. 12, Dec. 1968, pp. 2157-2162.
Yanlu Li, Patrick Segers, Joris Dirckx, and Roel Baets in "On-Chip Laser Doppler Vibrometer for Arterial Pulse Wave Velocity Measurement", Biomedical Optics Express, vol. 4, Issue 7, pp. 1229-1235, Jun. 2013.
Yanlu Li and Roel Baets in Homodyne Laser Doppler Vibrometer on Silicon-On-Insulator With Integrated 90 Degree Optical Hybrids:, Optics Express, vol. 21, Issue 11, pp. 13342-13350, Jun. 2013.

\* cited by examiner

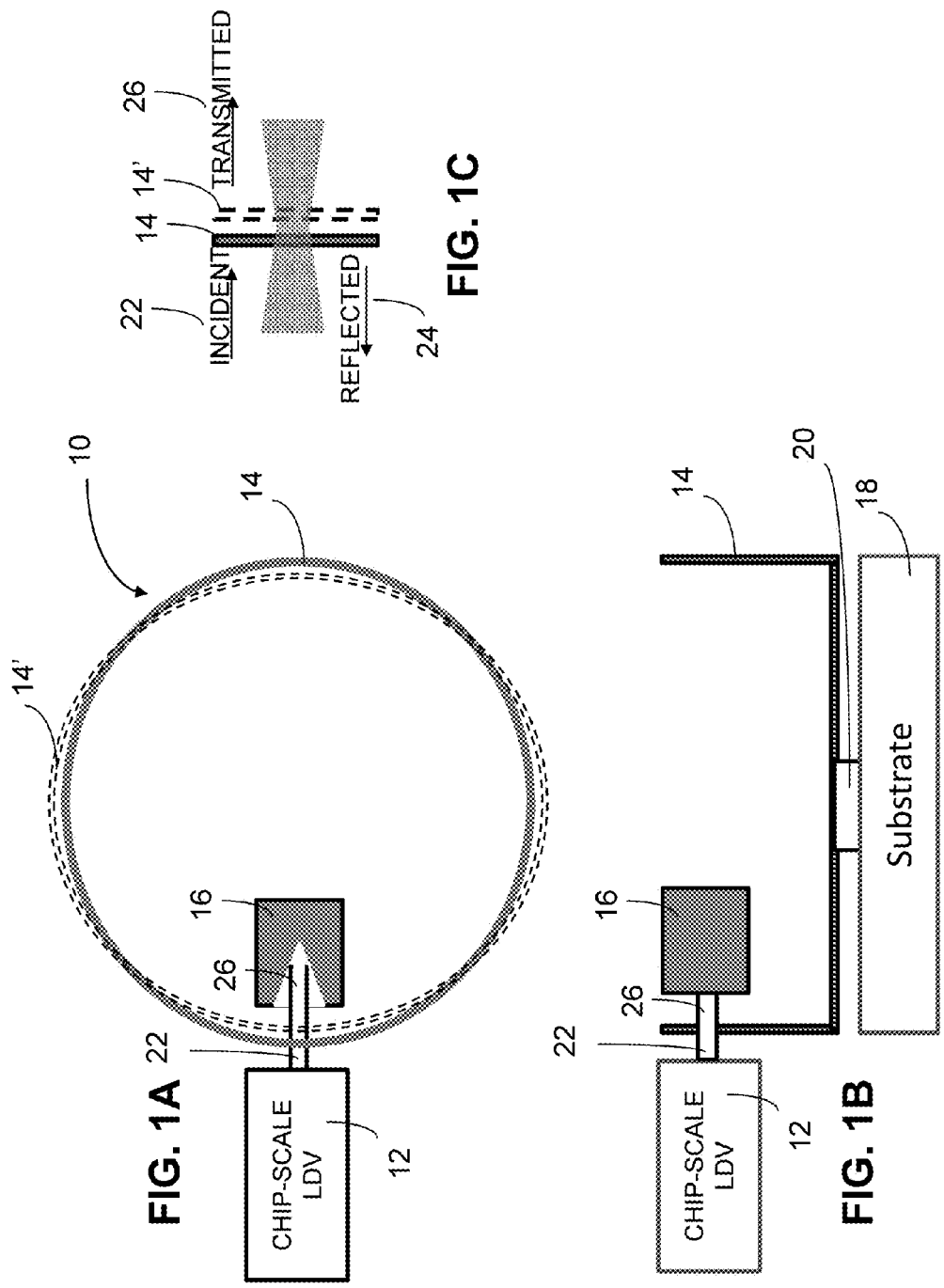

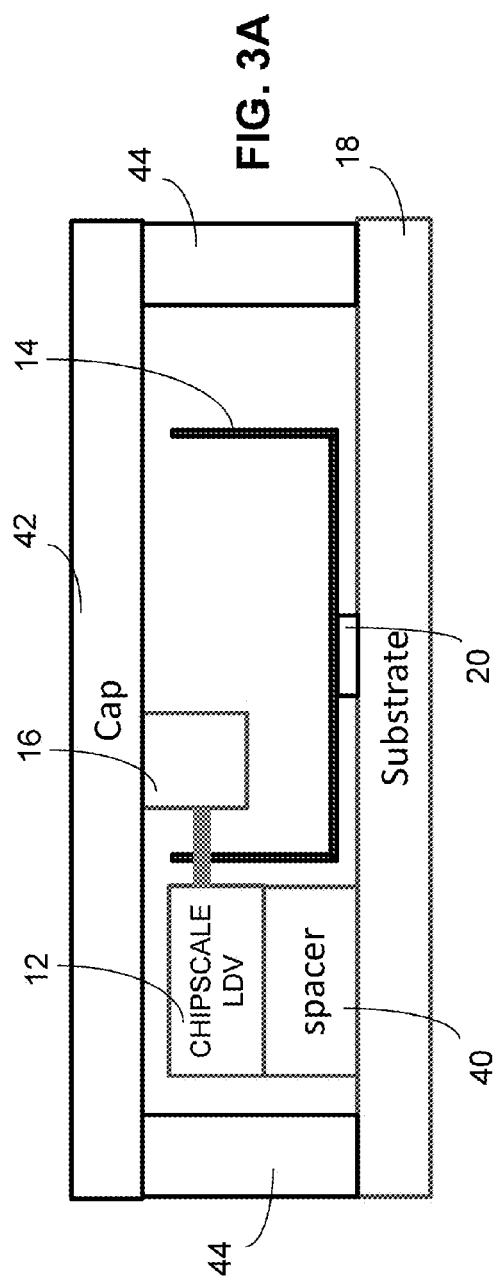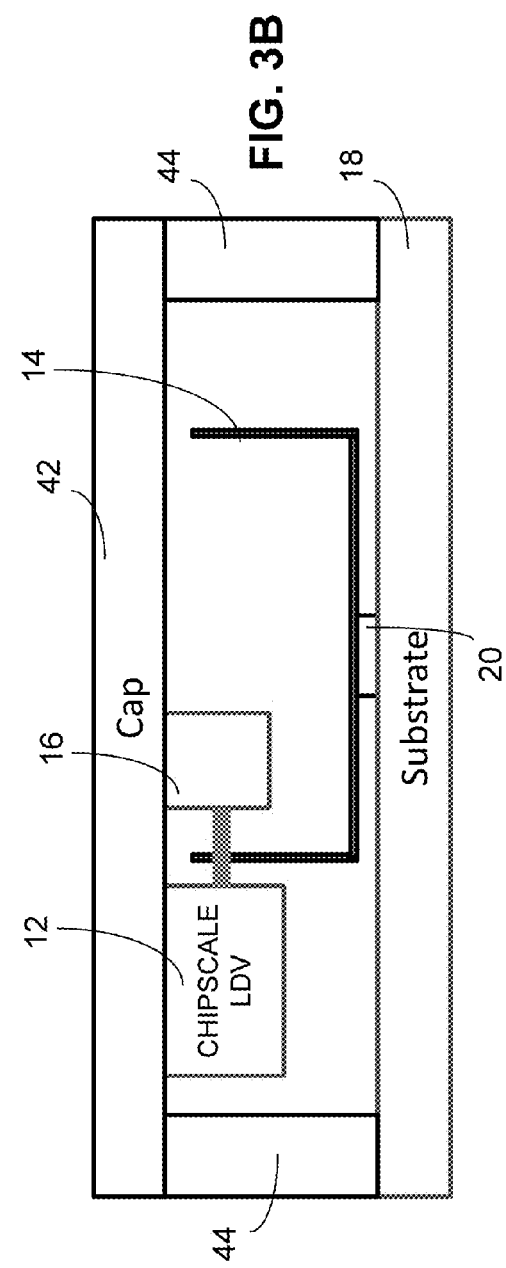

US 9,557,173 B1

INTEGRATED LASER VIBROMETER MEMS MICRO-SHELL GYROSCOPE

CROSS REFERENCE TO RELATED APPLICATIONS

None

STATEMENT REGARDING FEDERAL FUNDING

This application is related to U.S. application Ser. No. 14/024,506 filed Sep. 11, 2013, U.S. application Ser. No. 13/930,769 filed Jun. 28, 2013, which are incorporated herein by reference as though set forth in full.

TECHNICAL FIELD

This disclosure relates to gyroscopes, and in particular to micro electro mechanical systems (MEMS) vibratory gyroscopes.

BACKGROUND

Gyroscope motion, such as motion from a resonator, may be detected by amplifying small currents generated from the motion using electrical amplifiers. However, measuring these currents is difficult, because the electrical components may have a significant amount of parasitic capacitance and the amplifiers may generate additional noise.

Optical vibrometer measurements completely eliminate interaction with stray capacitances and the magnitude of the signal depends only on the strength of a laser sources, and not on the magnitude of the motion.

Vibratory micro scale gyroscopes are often tested in the lab using table-top laser vibrometers, as described by C. Acar, A. Shkel in MEMS Vibratory Gyroscopes, Spring 2009, and U.S. Pat. No. 5,883,715, issued Mar. 16, 1999, incorporated herein by reference.

The principle of operation of a laser Doppler vibrometer, as described by G. A. Massey in "An Optical Heterodyne Ultrasonic Image Converter" PROCEEDINGS OF THE IEEE, VOL. 56. NO. 12, DECEMBER 1968, incorporated herein by reference, has been developed and explored extensively in the literature.

Recently, there has been interest in lower cost, portable laser vibrometers for bio-medical applications. Such chip-scale laser vibrometers are described by Yanlu Li, Patrick Segers, Joris Dirckx, and Roel Baets in "On-chip laser Doppler vibrometer for arterial pulse wave velocity measurement", Biomedical Optics Express, Vol. 4, Issue 7, pp. 1229-1235 (2013), and by Yanlu Li and Roel Baets in "Homodyne laser Doppler vibrometer on silicon-on-insulator with integrated 90 degree optical hybrids", Optics Express, Vol. 21, Issue 11, pp. 13342-13350 (2013), which are incorporated herein by reference.

The prior art approaches require relatively large volumes and are not suitable to meet very small form factor requirements. They also have performance issues caused by stray reflections.

What is needed is a gyroscope that is very stable, that has a very small form factor, and that can be used in applications where cost, size, weight, and power are at a premium. The embodiments of the present disclosure answer these and other needs.

SUMMARY

In a first embodiment disclosed herein, a gyroscope comprises a dielectric resonator, a laser vibrometer on a first side of the dielectric resonator, and a laser dump for redirecting or absorbing light received at the laser dump from the laser vibrometer, the laser dump on a second side of the dielectric resonator, wherein a first distance between the dielectric resonator and the laser vibrometer ranges from 10 nm to 20 µm, and wherein a second distance between the dielectric resonator and the laser dump ranges from 10 nm to 20 µm.

In another embodiment disclosed herein, a method of fabricating a gyroscope comprises providing a substrate, providing a cap, providing a support for supporting the cap above the substrate, mounting a dielectric resonator to the substrate, mounting a laser vibrometer to the substrate so that the laser vibrometer is on a first side of the dielectric resonator, fabricating a laser dump on the cap, aligning the cap with the fabricated laser dump to the dielectric resonator and the laser vibrometer so that the laser dump is on a second side of the dielectric resonator; and bonding the cap to the support structure.

In yet another embodiment, a method of fabricating a gyroscope comprises providing a substrate, providing a cap, providing a support for supporting the cap above the substrate, mounting a dielectric resonator to the substrate, fabricating a laser vibrometer and a laser dump on the cap, wherein the laser vibrometer is aligned to the laser dump, aligning the cap with the fabricated laser vibrometer and the laser dump to the dielectric resonator so that the laser vibrometer is on a first side of the dielectric resonator and so that the laser dump is on a second side of the dielectric resonator, and bonding the cap to the support structure.

These and other features and advantages will become further apparent from the detailed description and accompanying FIG.s that follow. In the FIGs. and description, numerals indicate the various features, like numerals referring to like features throughout both the drawings and the description.

BRIEF DESCRIPTION OF THE DRAWINGS

FIG. 1A shows a top view of an integrated laser vibrometer MEMS micro-shell gyroscope in accordance with the present disclosure;

FIG. 1B shows a cross section view of the integrated laser vibrometer MEMS micro-shell gyroscope of FIG. 1A in accordance with the present disclosure;

FIG. 1C shows a detail of incident, reflected and transmitted light near the micro-shell of FIG. 1A in accordance with the present disclosure;

FIG. 2A shows a standard drive/sense configuration, FIG. 2B shows a configuration with a gain control loop, and FIGS. 2C and 2D show configurations with increased sensitivity in accordance with the present disclosure; and FIGS. 3A and 3B show structures for micro-shell gyroscopes in accordance with the present disclosure.

DETAILED DESCRIPTION

Figure 2A:
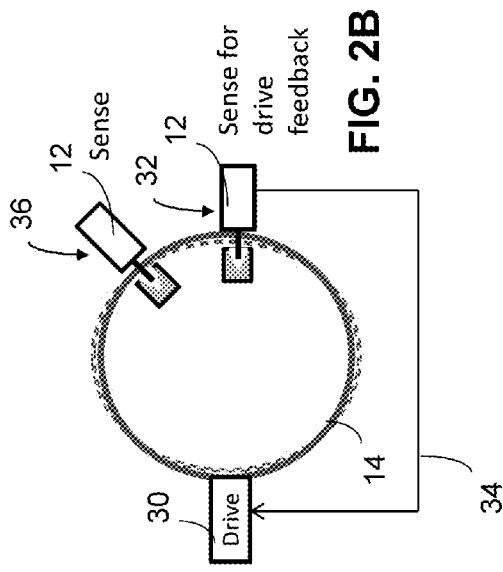
FIGS. 2A, 2B, 2C and 2D show top views of gyroscope configurations, where

In the following description, numerous specific details are set forth to clearly describe various specific embodiments disclosed herein. One skilled in the art, however, will understand that the presently claimed present disclosure may be practiced without all of the specific details discussed below. In other instances, well known features have not been described so as not to obscure the present disclosure.

The present disclosure describes a micro-scale gyroscope 10 which has a resonator 14 integrated with one or more on-chip laser vibrometers 12, each having an on chip light source, and a laser beam power dump 16. The laser beam power dump 16 absorbs laser energy that is directed to the power dump 16 to control and eliminate stray reflections that would otherwise reduce the performance of the laser vibrometer 12. The resonator 14 may be a micro-shell mechanical resonator 14, as shown in FIGS. 1A and 1B.

A micro-scale gyroscope according to the present disclosure can achieve navigation grade performance with a bias drift of less than 0.01 deg/hr, and have a very small volume, which may be less than 1 cm$^3$.

In micro-scale vibrometer devices, stray reflections are detrimental to performance. According to an embodiment of the present disclosure, precise lithography may be used to align the micro shell 14 to be sensed, the laser vibrometer 12, and the laser beam power dump 16. Angles, heights, and distances may be well defined and highly controlled. The accurate alignment eliminates stray reflections.

FIGS. 1A and 1B show a top view and cross section view, respectively, of an integrated laser vibrometer MEMS micro-shell gyroscope 10 in accordance with the present disclosure. The laser doppler vibrometer (LDV) 12, the micro-shell resonator 14, and the laser dump 16 are aligned so that the LDV 12 on one side or the outside of the micro-shell resonator 14 is aligned with the laser dump 16 on the other side or the inside of the micro-shell resonator.

The distance between the micro-shell resonator 14 and the LDV 12 may be several microns to 10s of microns, or from 10 nanometers (nm) to 20 micrometers (μm). The distance between the micro-shell 14 and the laser dump 16 may also be several microns to 10s of microns, or from 10 nm to 20 μm.

The laser doppler vibrometer 12 may include an integrated light source. As shown in FIG. 1A, and in more detail FIG. 1C, light 22 is transmitted from the LDV 12 to the micro-shell resonator 14. Part of the incident light 22 is reflected 24 from the micro-shell 14 and part of the incident light 22 is transmitted 26 through the micro-shell 14. The reflected light 24 that returns to the LDV 12 interferes with the transmitted light 22 from the LDV 12. Measurement of the interfered light provides velocity and therefore information on the displacement of the micro-shell 14. The displacement of the micro-shell 14 is shown in FIGS. 1A and 1C as micro-shell 14'.

The micro-shell 14 may be a resonant structure of dielectric material, and may be glass. The micro-shell 14 thickness may be 100s of nanometers to 10s of micrometers thick, or from 100 nm to 20 μm. The diameter of the micro-shell 14 can vary between 100s of microns to several millimeters, or from 10 μm to 15 millimeter (mm). The height of the micro-shell 14 may vary from 10s of microns to 100s of microns, or from 10 μm to 1 millimeter (mm). The micro-shell 14 may be any dielectric resonator, and may have any shape.

The laser dump 16 is used to capture any light 26 that is transmitted through the micro-shell 14, and the light 26 is absorbed or re-directed to prevent light 26 from interacting with other components or other sections of the micro-shell 14 and re-entering the LDV 12. The laser dump 16 may be absorptive material to absorb the light 26, such as a black silicon structure. The laser dump 16 assures that multiple LDV modules 12 that transmit to the same micro-shell 14 do not interfere with one another.

Gyroscope operation is based on driving and sensing resonate modes in a dielectric resonator, and the dielectric resonator may be a micro-shell 14, which may have wineglass resonate mechanical modes.

FIG. 2A shows one embodiment of a gyroscope, which has drive mechanisms 30 to drive resonate modes in the dielectric resonator 14 and sensors with LDVs 12 and laser dumps 16 to sense the displacement of the dielectric resonator. Any drive mechanism 30 may be used. In one example, the drive mechanisms 30 drive the primary mode, which couples mechanical energy to the orthogonal, 45 degree rotated, sense mode. The on-chip LDVs 12 sense the motion of the micro-shell resonator 14. The LDV 12 produces a signal that is proportional to the rotation/rotation rate of the micro-shell 14.

Figure 2B:
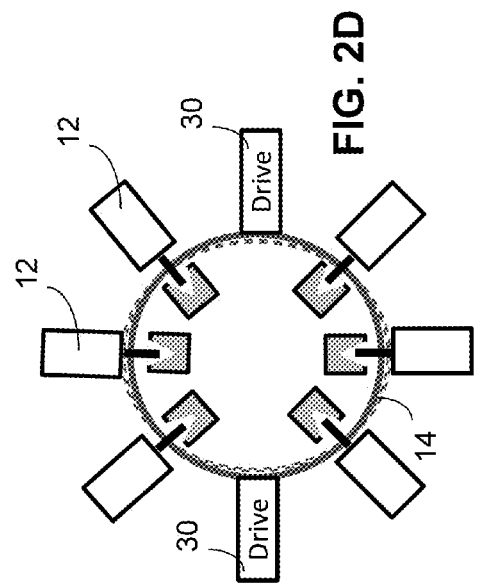

FIG. 2B shows another embodiment of a gyroscope. A sensor 32 with an LDV 12 and laser dump 16 is aligned directly opposite from the drive mechanism 30 to monitor and stabilize the drive mechanism 30 amplitude, by feeding the sensed drive amplitude back to the drive mechanism 30 for automatic gain control. Another sensor 36 with an LDV 12 and laser dump 16 may be used to sense the motion of micro-shell 14.

Figure 2C:
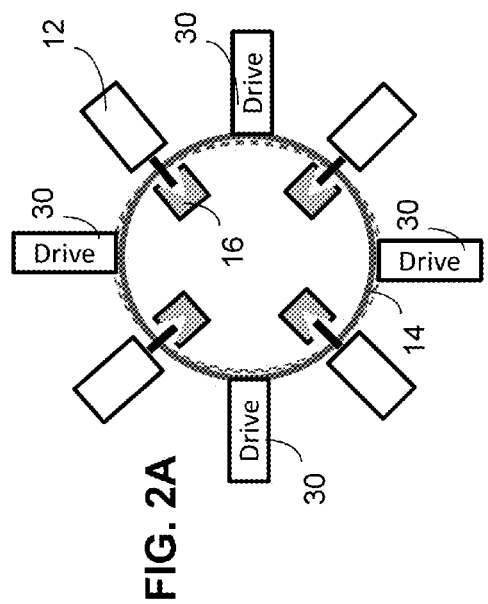
Figure 2D:
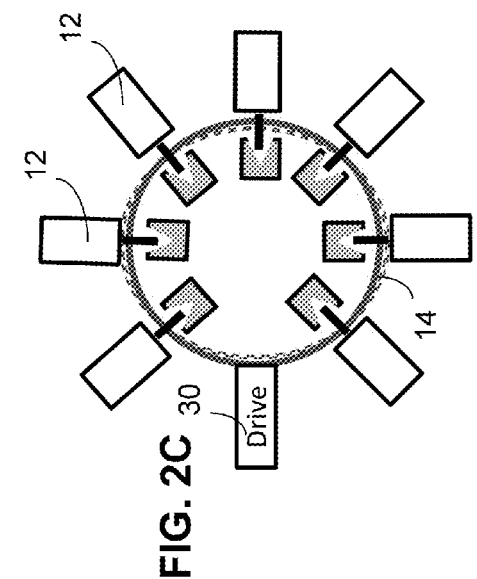

FIGS. 2C and 2D shows other possible drive and sense configurations. These configurations take advantage of the micro-scale nature of the LDVs 12 and laser dumps 16, which by being integrated with the micro-shell 14, allow many points of measurement for both the drive amplitude and for the displacement of the micro-shell 14. Differential measurements between pairs of LDV sensors may also be made.

FIGS. 3A and 3B show how to integrate and align the laser doppler vibrometers (LDVs) 12, the dielectric or micro-shell resonator 14, and the laser dumps 16. In FIGS. 3A and 3B only one laser doppler vibrometer (LDV) 12 and one laser dump 16 are shown; however, a person skilled in the art would understand that additional LDVs and laser dumps can be added to realize any configuration of LDVs and laser dumps, such as those shown in FIGS. 2A, 2B, 2C and 2D.

FIG. 3A shows a cross section of one embodiment of an integrated laser doppler vibrometer (LDV) 12, micro-shell resonator 14, and laser dump 16. The micro-shell 14 may be supported on substrate 18 by support 20, as shown in FIG. 3A. The LDV 12 may be supported on the substrate 18, and raised from the substrate 18 by a spacer 40 to elevate the optical path of the LDV 12 to a height appropriate for sensing displacement of the micro-shell resonator 14. Supports or walls 44 on the substrate 18 support a cap 42 above the micro-shell 14. The supports 44, substrate 18, and cap 42 may form an enclosure around the LDV 12, the micro-shell resonator 14, and the laser dump 16. In this embodiment the laser power dump 16 is fabricated on the cap 42 in such a position that when the cap 42 is bonded to supports 44, the laser doppler vibrometer (LDV) 12, the micro-shell resonator 14, and the laser dump 16 are aligned. The alignment may use lithographic targets.

FIG. 3B shows a cross section of another embodiment of an integrated laser doppler vibrometer (LDV) 12, micro-shell resonator 14, and laser dump 16. The micro-shell 14 is again supported on substrate 18 by support 20, as shown in FIG. 3B. Supports or walls 44 on the substrate 18 support a cap 42 above the micro-shell 14. The supports 44, substrate 18, and cap 42 may form an enclosure around the LDV 12, the micro-shell resonator 14, and the laser dump 16. In this embodiment the LDV 12 and the laser power dump 16 are fabricated on the cap 42 in such a position that when the cap 42 is bonded to supports 44, the laser doppler vibrometer (LDV) 12, the micro-shell resonator 14, and the laser dump 16 are aligned. By fabricating both the LDV 12 and the laser power dump 16 on the cap 42, the LDV 12 and the laser dump 16 are aligned to one another during fabrication on the cap 42, which may be a wafer. The LDV 12 and laser power dump 16 may be fabricated on a single wafer using precise lithography. Then the wafer or cap 42 can be aligned to the supports 44 using lithographic targets and bonded.

In both embodiments of FIGS. 3A and 3B, MEMS fabrication techniques may be used to accurately align all three critical components, the LDVs 12, the micro-shell 14, and the laser dumps 16, in all dimensions. MEMS microscale fabrication techniques include wafer bonding and precise alignment through lithography. This alignment allows LDV 12 sensing to be used on the micro-scale.

Having now described the present disclosure in accordance with the requirements of the patent statutes, those skilled in this art will understand how to make changes and modifications to the present invention to meet their specific requirements or conditions. Such changes and modifications may be made without departing from the scope and spirit of the present disclosure as disclosed herein.

The foregoing Detailed Description of exemplary and preferred embodiments is presented for purposes of illustration and disclosure in accordance with the requirements of the law. It is not intended to be exhaustive nor to limit the present disclosure to the precise form(s) described, but only to enable others skilled in the art to understand how the present disclosure may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the present disclosure be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A gyroscope comprising:
  a dielectric resonator, wherein the dielectric resonator is a micro-shell;
  a laser vibrometer near a first side of the micro-shell, wherein the first side is outside the micro-shell; and
  a laser dump near a second side of the micro-shell, wherein the second side is inside the micro-shell;
  wherein the laser vibrometer and the laser dump are aligned to one another so that light transmitted by the laser vibrometer to the micro-shell and passing through the micro-shell from the outside to the inside is absorbed by the laser dump.

2. The gyroscope of claim 1 wherein:
  the micro-shell has a thickness ranging from 100 nm to 20 µm thick;
  the micro-shell has a diameter ranging from 10 µm to 15 mm; and
  the micro-shell has a height ranging from 10 µm to 1 mm.

3. The gyroscope of claim 1 wherein the gyroscope has a volume of less than 1 cm$^3$.

4. The gyroscope of claim 1 further comprising:
  a drive mechanism coupled to the dielectric resonator.

5. The gyroscope of claim 4 wherein:
  the drive mechanism is coupled to the laser vibrometer to provide automatic gain control to the drive mechanism.

6. The gyroscope of claim 1 further comprising:
  a substrate;
  a cap; and
  a support for supporting the cap above the substrate;
  wherein the dielectric resonator is coupled to the substrate;
  wherein the laser vibrometer is coupled to the substrate;
  wherein the laser dump is coupled to the cap; and
  wherein the dielectric resonator, the laser vibrometer and the laser dump are aligned to one another.

7. The gyroscope of claim 6 further comprising:
  a spacer between the laser vibrometer and the substrate to elevate an optical path of the laser vibrometer to a height for measuring a displacement of the dielectric resonator.

8. The gyroscope of claim 1 further comprising:
  a substrate;
  a cap; and
  a support for supporting the cap above the substrate;
  wherein the dielectric resonator is coupled to the substrate;
  wherein the laser vibrometer is coupled to the cap;
  wherein the laser dump is coupled to the cap; and
  wherein the dielectric resonator, the laser vibrometer and the laser dump are aligned to one another.

9. The gyroscope of claim 1:
  wherein a first distance between the dielectric resonator and the laser vibrometer ranges from 10 nm to 20 µm; and
  wherein a second distance between the dielectric resonator and the laser dump ranges from 10 nm to 20 µm.

10. A method of fabricating a gyroscope comprising:
  providing a substrate;
  providing a cap;
  mounting a support on the substrate for supporting the cap above the substrate;
  mounting a dielectric resonator to the substrate, wherein the dielectric resonator is a micro-shell;
  mounting a laser vibrometer to the substrate so that the laser vibrometer is near a first side of the micro-shell, wherein the first side is outside the micro-shell;
  mounting a laser dump on the cap;
  aligning the cap with the mounted laser dump to the dielectric resonator and the laser vibrometer so that the laser dump is near a second side of the micro-shell, wherein the second side is inside the micro-shell, and so that light transmitted by the laser vibrometer to the micro-shell and passing through the micro-shell from the outside to the inside is absorbed by the laser dump; and
  bonding the cap to the support structure.

11. The method of claim 10 wherein:
  the micro-shell has a thickness ranging from 100 nm to 20 µm thick;

the micro-shell has a diameter ranging from 10 µm to 15 mm; and the micro-shell has a height ranging from 10 µm to 1 mm.

12. The method of claim 10 wherein the gyroscope has a volume of less than 1 cm$^3$.

13. The method of claim 10 further comprising:

providing a drive mechanism coupled to the dielectric resonator; and coupling the drive mechanism to the laser vibrometer to provide automatic gain control to the drive mechanism.

14. The method of claim 10 wherein:

a first distance between the dielectric resonator and the laser vibrometer ranges from 10 nm to 20 µm; and a second distance between the dielectric resonator and the laser dump ranges from 10 nm to 20 µm.

15. A method of fabricating a gyroscope comprising:

providing a substrate;

providing a cap;

mounting a support on the substrate for supporting the cap above the substrate;

mounting a dielectric resonator to the substrate, wherein the dielectric resonator is a micro-shell;

mounting a laser vibrometer and a laser dump on the cap, wherein the laser vibrometer is aligned to the laser dump;

aligning the cap with the mounted laser vibrometer and the laser dump to the micro-shell so that the laser vibrometer is near a first side of the micro-shell, wherein the first side is outside the micro-shell, so that the laser dump is near a second side of the micro-shell, wherein the second side is inside the micro-shell, and so that light transmitted by the laser vibrometer to the micro-shell and passing through the micro-shell from the outside to the inside is absorbed by the laser dump; and bonding the cap to the support structure.

16. The method of claim 15 wherein:

the micro-shell has a thickness ranging from 100 nm to 20 µm thick;

the micro-shell has a diameter ranging from 10 µm to 15 mm; and the micro-shell has a height ranging from 10 µm to 1 mm.

17. The method of claim 15 wherein the gyroscope has a volume of less than 1 cm$^3$.

18. The method of claim 15 further comprising:

providing a drive mechanism coupled to the dielectric resonator; and coupling the drive mechanism to the laser vibrometer to provide automatic gain control to the drive mechanism.

19. The method of claim 15 wherein:

a first distance between the dielectric resonator and the laser vibrometer ranges from 10 nm to 20 µm; and a second distance between the dielectric resonator and the laser dump ranges from 10 nm to 20 µm.

* * * * *